United States Patent
Shaffer et al.

(10) Patent No.: US 8,481,839 B2
(45) Date of Patent: Jul. 9, 2013

(54) SYSTEM AND METHODS FOR SYNCHRONIZING AUDIO AND/OR VISUAL PLAYBACK WITH A FINGERING DISPLAY FOR MUSICAL INSTRUMENT

(75) Inventors: John R. Shaffer, Reno, NV (US); Ken Pletzer, Canton, MI (US)

(73) Assignee: Optek Music Systems, Inc., Reno, NV (US)

( * ) Notice: Subject to any disclaimer, the term of this patent is extended or adjusted under 35 U.S.C. 154(b) by 676 days.

(21) Appl. No.: 12/547,751

(22) Filed: Aug. 26, 2009

(65) Prior Publication Data

US 2010/0077306 A1 Mar. 25, 2010

Related U.S. Application Data

(60) Provisional application No. 61/091,818, filed on Aug. 26, 2008.

(51) Int. Cl.
*G10H 1/36* (2006.01)

(52) U.S. Cl.
USPC .................. 84/610; 84/609; 84/612; 84/634; 84/649; 84/650; 84/652

(58) Field of Classification Search
None
See application file for complete search history.

(56) References Cited

U.S. PATENT DOCUMENTS

| | | | | |
|---|---|---|---|---|
| 4,876,937 A * | 10/1989 | Suzuki | | 84/612 |
| 5,266,736 A * | 11/1993 | Saito | | 84/612 |
| 5,690,496 A * | 11/1997 | Kennedy | | 434/307 R |
| 6,388,181 B2 * | 5/2002 | Moe | | 84/477 R |
| 7,105,733 B2 * | 9/2006 | Jarrett et al. | | 84/601 |
| 7,223,913 B2 * | 5/2007 | Knapp et al. | | 84/722 |
| 7,446,253 B2 * | 11/2008 | Knapp et al. | | 84/722 |
| 7,579,543 B2 * | 8/2009 | Haruyama et al. | | 84/601 |
| 7,851,689 B2 * | 12/2010 | Reynolds et al. | | 84/610 |
| 7,893,337 B2 * | 2/2011 | Lenz | | 84/477 R |
| 7,897,865 B2 * | 3/2011 | Uehara | | 84/645 |
| 2006/0027079 A1 * | 2/2006 | Uehara | | 84/609 |
| 2006/0254407 A1 * | 11/2006 | Jarrett et al. | | 84/601 |
| 2008/0060503 A1 * | 3/2008 | Uehara | | 84/609 |
| 2009/0173215 A1 * | 7/2009 | Reynolds et al. | | 84/612 |
| 2009/0235808 A1 * | 9/2009 | Salter | | 84/485 R |
| 2010/0162878 A1 * | 7/2010 | Lengeling et al. | | 84/483.2 |
| 2010/0162880 A1 * | 7/2010 | Luedecke et al. | | 84/645 |
| 2010/0313736 A1 * | 12/2010 | Lenz | | 84/477 R |
| 2011/0283867 A1 * | 11/2011 | Ihara | | 84/478 |

* cited by examiner

*Primary Examiner* — Marlon Fletcher

(74) *Attorney, Agent, or Firm* — Finnegan, Henderson, Farabow, Garrett & Dunner, LLP

(57) ABSTRACT

Disclosed herein are various systems and methods for audio and/or visual playback. A system can include a first data encoded according to a first file format, a second data encoded according to a second file format, and a file using the first and second data to enable synchronized audio and/or visual playback of the data on one or more receiving elements. In certain instances, at least a portion of the second data includes information relating to finger positions on a musical instrument.

39 Claims, 8 Drawing Sheets

SYSTEM AND METHODS FOR SYNCHRONIZING AUDIO AND/OR VISUAL PLAYBACK WITH A FINGERING DISPLAY FOR MUSICAL INSTRUMENT

The present disclosure claims priority under 35 U.S.C. §119 to U.S. Provisional Patent Application No. 61/091,818, which was filed on Aug. 26, 2008, which is also hereby incorporated by reference in its entirety.

FIELD OF THE INVENTION

The present invention generally relates to musical instruments. Particularly, the present invention relates to improved audio and/or visual cues for teaching a person to learn musical instruments.

BACKGROUND OF THE INVENTION

The prior art includes many types of data encoded in files for playback on a data processing system. Two common types of audio and/or video files are Windows Media and QuickTime. These audio and/or video files are typically processed and played at a particular rate or tempo. When the tempo of playback differs from the tempo at which the audio was recorded or intended to be played, the audio pitch changes in direct proportion. However, data in a MIDI are processed as audio tracks, wherein the audio is expressed in notes and rhythms assigned to particular instrumental sounds, rather than actual sound data, so that the fidelity of the pitch is preserved despite a change in the tempo. As a tradeoff, the timbre, or the sound quality experienced when a MIDI file is played may depend upon the quality of the synthesizer and instrument samples.

SUMMARY OF THE INVENTION

The inventors of the present invention recognized that transmitting finger positions to stringed instruments having a light-system was advantageous. For example, methods and apparatuses such as those described in U.S. Pat. Pub. No. 2006/0236850 A1 and U.S. Pat. Nos. 4,915,005 and 5,266,735, and 7,173,175, each of which are hereby incorporated in their entirety by reference, have been shown to be useful.

The inventors of the present invention recognized that combining data corresponding to finger positions encoded in certain data formats with music data advantageously allows students to change the speed at which the finger position information is displayed and to change the speed at which the associated music is played, without changing the pitch, in some embodiments.

The inventors of the present invention further recognized that systems and methods enabling the playback of other data encoded in certain data formats may advantageously improve upon the existing system and methods for music training, in some embodiments.

The inventors of the present invention further recognized that systems and methods enabling the playback of certain combinations of data encoded using different data formats may advantageously improve upon the existing system and methods for music training, in some embodiments.

One embodiment consistent with principles of the invention is a computer-implemented method for audio and/or visual playback, including a first data encoded according to a first file format. The method may further include a second data encoded according to a second file format. The second data may include data relating to finger positions on a musical instrument. The method may further provide a file using the first and second data. The file may additionally be enabled for synchronized audio and/or visual playback of the first and second data.

Another embodiment consistent with principles of the invention is a data processing system for audio and/or visual playback, including a first data encoded according to a first file format. The system may further include a second data encoded according to a second file format. The second data may include data relating to finger position on a musical instrument. The system may comprise a file using the first and second data. The file may advantageously be adapted to enable synchronized audio and/or visual playback of the first and second data.

Additional embodiments consistent with principles of the invention are a data processing system and computer-implemented method for allowing user input to adapt the file for synchronized audio and/or visual playback.

Another embodiment consistent with principles of the invention is a data processing system including the file, enabled for synchronized audio and/or visual playback, and a program configured to process the file and transform the data into audio and/or visual components.

Another embodiment consistent with principles of the invention is a data processing system described herein, further including one or more receiving systems selected from a set including an audio system, a display system, an additional data processing system, and an instrument system, wherein the instrument system is configured to convey finger positions based on the received data.

Another embodiment consistent with principles of the invention is a computer-implemented method for audio and/or visual playback, including the step of reading a file. The step of reading a file may further include processing the file and transforming data from the file into audio and/or visual components having a pre-selected tempo. The file may use a first data encoded according to a first file format and a second data encoded according to a second file format, wherein the second data may include information relating to finger positions on a musical instrument.

Another embodiment consistent with principles of the invention is a computer-implemented method described herein, further comprising a step of responding to a change in tempo. The change in tempo may be initiated by a user. One or more responses may be selected from a set comprising selecting a threshold; interpolating data; playing a portion of the second data during a time in which the threshold is not achieved, wherein the portion of the second data replaces audio and/or visual playback of at least a portion of the first data; and playing a third data during a time in which the threshold is not achieved, wherein the third data replaces audio and/or visual playback of at least a portion of the first data.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed. Additionally, it is to be understood that other embodiments may be utilized and that electrical, logical, and structural changes may be made without departing form the spirit and scope of the present invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Reference is now made in detail to exemplary embodiments of the invention, examples of which are illustrated in the accompanying drawings. Wherever possible, the same reference numbers will be used throughout the drawings to refer to the same or like parts. In the following detailed description, reference is made to the accompanying drawings, which form a part hereof and in which is shown by way of illustration specific embodiments in which the invention may be practiced. These embodiments are described in sufficient detail to enable one skilled in the art to practice and use the invention, and it is to be understood that other embodiments may be utilized and that electrical, logical, and structural changes may be made without departing from the spirit and scope of the present invention.

Figure 1:
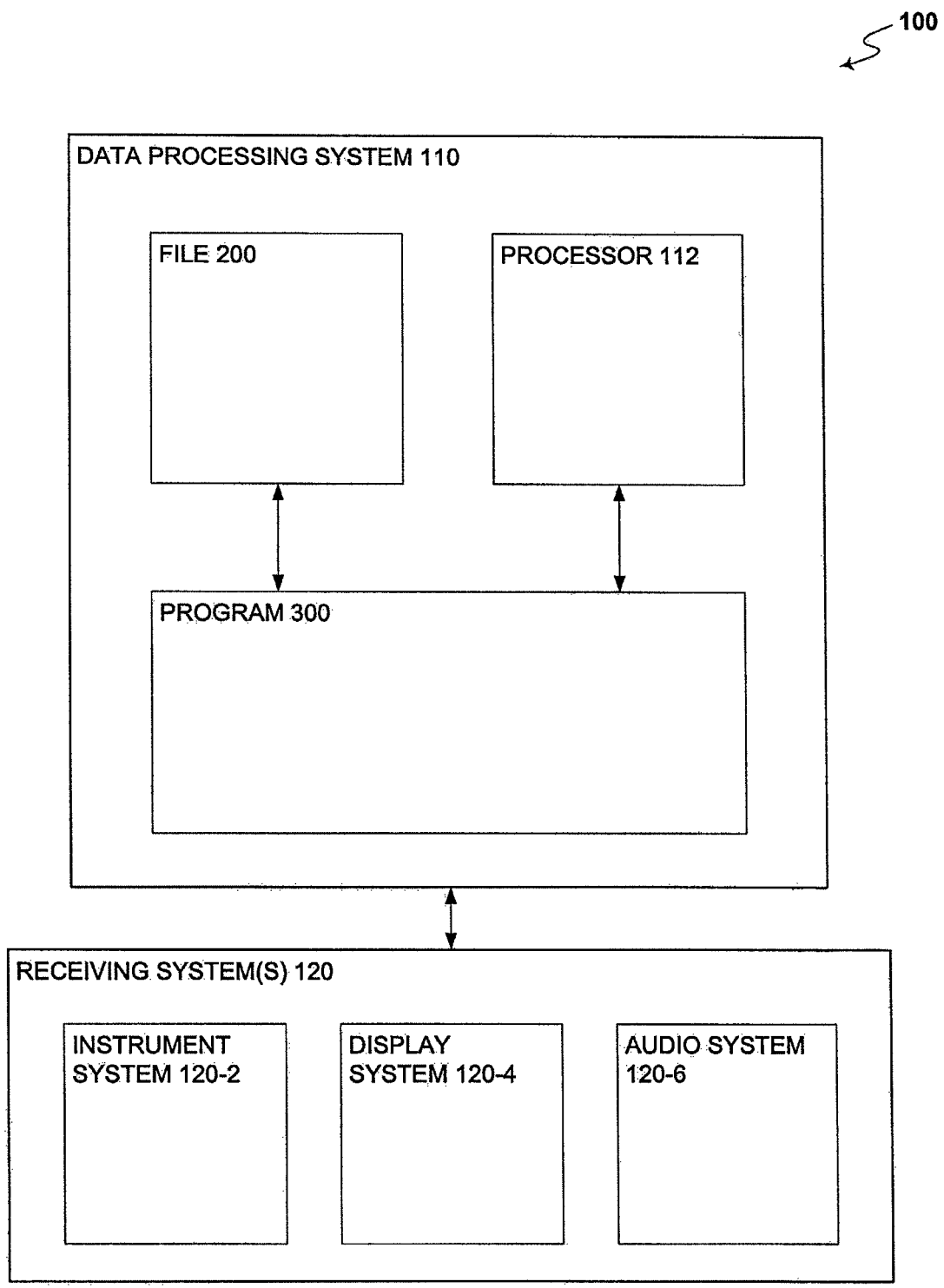
FIG. 1 illustrates an exemplary embodiment of a system for the synchronized playing of audio and/or visual data.

FIG. 1 is a block diagram of an embodiment of a system 100 for the synchronized playing of audio and/or visual data consistent with the features and principles of the present invention. As shown, system 100 comprises a data processing system 110. Data processing system 110 typically has a processor 112 for processing program instructions. Data processing system 110 may also comprise one or more memory storage devices including flash memory, RAM, a hard disk, CD, and DVD, not shown. A file 200, described in detail with reference to FIG. 2, may be stored in data processing system 110 and made accessible to program 300. Program 300, described in detail with reference to FIG. 3, may also be stored in data processing system 110. While FIG. 1 shows a single data processing system 110 and its components, it is understood by those skilled in the art that system 100 for the synchronized playing of audio and/or visual data, consistent with the features and principles of the present invention, may be distributed over more than one data processing system. For example, file 200 may be stored on a separate data processing system performing the functions of a file server. In such embodiments, program 300 may stream file 200 over a network. In another embodiment consistent with the spirit and scope of the invention, program 300 may be operated through a web interface such as a web browser on a computer or mobile device. Additionally, it is understood by those skilled in the art that data processing system 110 may comprise one or more processors. For example, program 300 may be further divided into various modules and distributed across more than one system.

As shown, exemplary system 100 further comprises one or more receiving systems 120 operatively connected to data processing system 110. A receiving system may be an instrument system 120-2, a display system 120-4, and/or an audio system 120-6, which may receive data from data processing system 110, and transform the data into audio and/or visual components. In one embodiment consistent with the principles of the invention, instrument system 120-2 may be a guitar having a light system, as described in U.S. Pat. Nos. 5,266,735 and 4,915,005. Display system 120-4 may be an LCD monitor, a television screen, a light system, or any other apparatus for displaying visual information. Audio system 120-6 may be a speaker system or other apparatus for conveying audio information. The receiving systems may have any connection interface or combination of connection interfaces, including USB, serial bus, and wireless to connect to data processing system 110. While the figures depict each receiving system 120 performing a different function, it is understood by one skilled in the art that a receiving system may perform more than one receiving function. For example, a monitor with built-in speakers may perform the functions of both display system 120-4 and audio system 120-6. As another example, a guitar having a light system may perform the functions of all three receiving systems 120-2, 120-4, and 120-6. These and other embodiments are within the spirit and scope of the present invention. It should be understood that the receiving systems 120 are not limited to receiving capabilities and may also perform other functions such as transmitting and transforming data.

In an exemplary embodiment, the system for synchronized playing of audio and/or visual data 100 may receive user input, not shown. The user may provide input to program 300 via a keyboard, a mouse, or another input mechanism, such as a MIDI pickup. In another embodiment, instrument system 120-2 may be equipped to receive user input and transmit user input to program 300, consistent with the features and principles of the invention.

Figure 2:
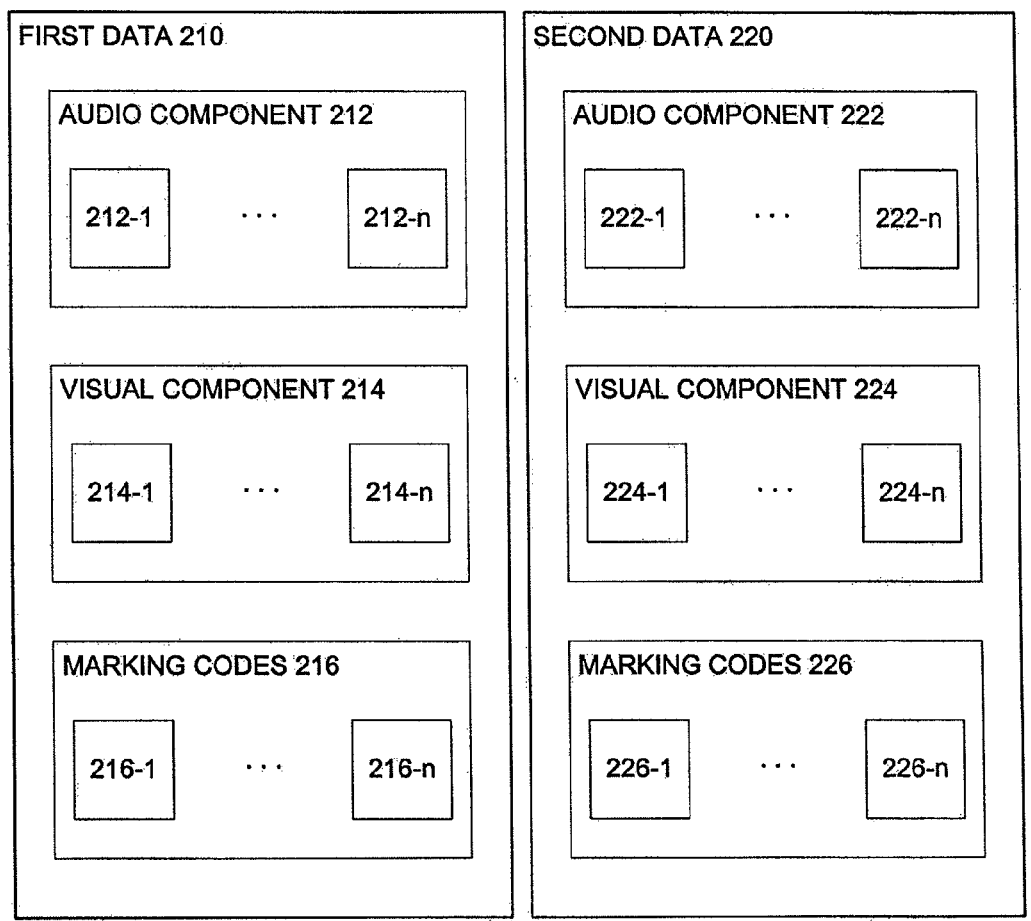
FIG. 2 illustrates an exemplary embodiment of a file used by an exemplary system for the synchronized playing of audio and/or visual data.

FIG. 2 is a block diagram of an embodiment of a file 200 to be used by program 300, consistent with the features and principles of the present invention. File 200 may be stored in data processing system 110 and made accessible to program 300. Access may be provided between program and memory on data processing system 110. Alternatively, file 200 may be streamed over a network via a wireless or wired connection. As shown, file 200 may include first data 210 and second data 220. Alternatively, all or a portion of first data 210 and/or second data 220 may exist outside of file 200, and file 200 may contain references to one or more memory space addresses where the data are stored. In another embodiment not shown, file 200 may further include third data. Also not shown, another embodiment of file 200 may include more than one data encoded according to the second file format. For example, an embodiment of file 200 may include a first data encoded according to the Audio Video Interleave format, and two or more additional data, each encoded according to the MIDI format, each data corresponding to at least a portion of the first data. In some embodiments, two pieces of data may be considered corresponding if the audio and/or video portion of the data are intended to play synchronously. For example, a portion of audio data in a MIDI file may match or come close to matching when played simultaneously with a corresponding mp3 file, the same tones, timbre, and/or tempo of the mp3 file. As another example, a portion of the visual component in a MIDI file may comprise finger position data that illuminate finger positions on a guitar fret that, when strummed or played simultaneously with a corresponding MPEG-4 or Windows Media Video file, may match or come close to matching the tones, timbre, and/or tempo of the video file. These and other embodiments are within the spirit and scope of the invention.

First data 210 may include portions of audio component 212, visual component 214, and marking codes 216, though it need not include all three components 212, 214, and 216. These portions need not be contiguous, and the block representation is for illustrative purposes only. Audio component 212 is the data component of first data 210 that may be processed and transformed into audio. In an exemplary embodiment, audio component 212 may be processed into sound that can be heard through speakers, such as a musical performance or spoken instructions for a lesson. For example, audio component 212 can include English language and/or non-English language dialog. In particular, parts of the audio data may be in a first language while other parts of the audio may be in a second language. Further, one or more tracks may be provided for one or more audio components 212 such that a user may select between one or more languages.

Visual component 214 is the data component of first data 210 that may be processed and transformed into visual cues. In an exemplary embodiment, visual component 214 may be processed as video that can be viewed on a monitor or alternate display device, such as a musical performance, concert, or video of an instructor teaching a lesson. Marking codes 216 is the data component of first data 210 that may be used for data correlation between first data 210 and second data 220. In an exemplary embodiment, marking codes 216 may comprise a SMPTE time code, frames, and/or any marking of time, including a marking of real time.

In an exemplary embodiment, first data 210 may be encoded in a format such as Windows Media, QuickTime, Macromedia Flash, or RealMedia. In an alternate embodiment, first data 210 may be encoded in a format that is uncompressed or lossless, such as Apple lossless. While some exemplary embodiments of the invention may use a standard encoding format to encode first data 210, it is understood by those skilled in the art that alternate encodings, including non-standard encodings, may be used within the spirit and scope of the invention disclosed herein. For example, some file types or formats representative of suitable encoding formats include but are not limited to m4a, wma, mp3, wav, aac, aaf, avi, mov, m1v, m2v, divx, wmv, xvid, qtch, mpeg, mpeg4, asf, H.263, and H.264.

Second data 220 may include portions of audio component 222, visual component 224, and marking codes 226, though it need not include all three components 222, 224, and 226. These portions need not be contiguous, and the block representation is for illustrative purposes only. Audio component 222 is the data component of second data 220 that may be processed and transformed into audio. In an exemplary embodiment, audio component 222 may be processed as music that can be heard through speakers. Visual component 224 is the data component of second data 220 that may be processed and transformed into visual cues. In an exemplary embodiment, visual component 224 may be processed as fretlight data that causes one or more LEDs on a guitar fret to illuminate. Marking codes 226 is the data component of second data 220 that may be used for data correlation between first data 210 and second data 220. In an exemplary embodiment, marking codes 226 may comprise one or more tempo settings, a SMPTE time code, tick position, markers and/or a measure of the number of ticks per quarter note, which may also be referred to as a time base, or alternate measure of tempo. In some embodiments, the definition of a marker may include tick positions and/or SMPTE time codes. In such embodiments, a set comprising a tick position, a marker, and a SMPTE time code, as disclosed in the claims, may comprise elements that are not necessarily disjoint.

In an exemplary embodiment, second data 220 may be encoded in a format such as MIDI or text. While some exemplary embodiments of the invention may use a standard encoding format to encode second data 220, it is understood by those skilled in the art that alternate encodings, including non-standard encodings, may be used within the spirit and scope of the invention disclosed herein. In exemplary embodiments where second data 220 is encoded in a MIDI format, a producer or user may create second data 220 using a program that receives tempo and pitch and/or note data. The program may receive such data via a MIDI pickup, or via user input. The program may translate chords into known finger positions on a guitar fret and incorporate the finger position data in second data 220.

As shown, each of the components in first data 210 and second data 220 may comprise subcomponents. For example, audio component 212 and 222 may comprise two or more subcomponents 212-1 through 212-*n* and 222-1 through 222-*n*, respectively. In an exemplary embodiment, audio subcomponent 212-1 may be correlated to audio subcomponent 222-1. In alternate embodiments, there need not exist a one-to-one correlation between subcomponents in audio component 212 and audio component 222. In still another embodiment, audio subcomponents 212-1 through 212-*n* may be correlated to visual subcomponents 214-1 through 214-*n* and visual subcomponents 224-1 through 224-*n*. As before, there need not exist a one-to-one correlation between subcomponents. It should be apparent to those skilled in the art that components and subcomponents, as shown, may be illustrative conceptual representations rather than literal portions of file 200.

In some embodiments, a correlation program, not shown, may be used to correlate subcomponents of first data 210 and subcomponents of second data 220. For example, a correlation program may be used to insert appropriate marking codes in real time. In such an embodiment, a producer may listen to and/or watch the playback of first data 210. While listening, a producer may tap the tempo on a computer keyboard, a musical instrument, a mouse, or any other peripheral device that may be used to receive user input and transmit input to the correlation program. The tempo that is recorded from the producer's input may be translated and embedded into second data 220. The correlation program may also enable a producer to insert appropriate-duration pauses. The correlation program is applicable in many instances, such as when the real-time playback of a musical recording does not precisely match the sheet music.

As an illustrative example, the correlation program may enable program 300 to correlate subcomponents of audio component 212 with subcomponents of audio 222, including a one-to-one matching of 212-1 to 222-1, . . . , 212-*n* to 222-*n*. Subcomponents of visual component 224 may also be matched to subcomponents of audio component 222. Matching may also include a one-to-one matching of 222-1 to 224-1, . . . , 222-*n* to 224-*n*. However, a one-to-one matching is not necessary, and it should be apparent from the disclosure that subcomponents shown in FIG. 2 are abstract representations of components within file 200 and not physical limitations.

Figure 3:
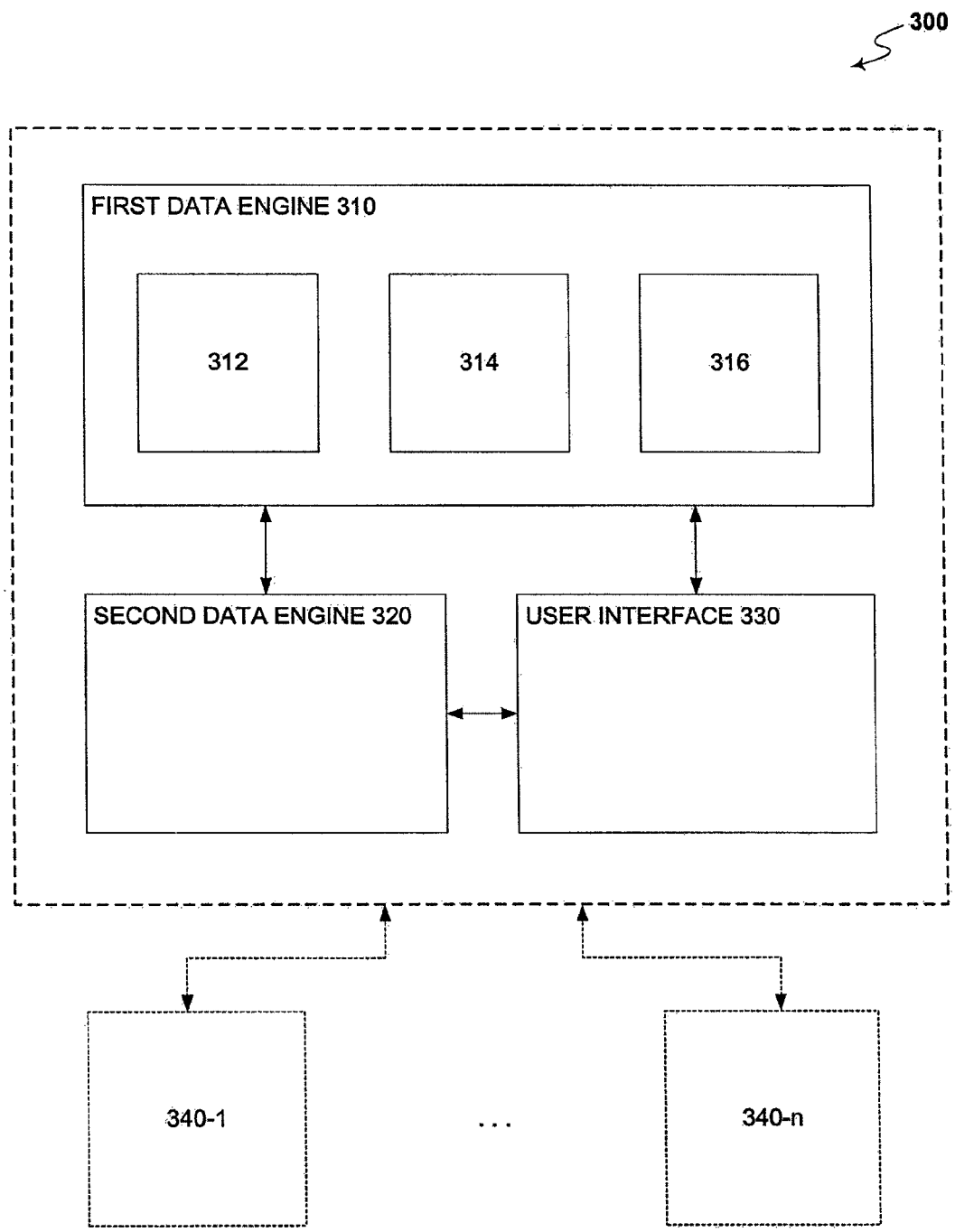
FIG. 3 illustrates an exemplary embodiment of a program for the synchronized playing of audio and/or visual data.

FIG. 3 is a block diagram representation of an exemplary embodiment of a program 300 for the synchronized playing of audio and/or visual data, consistent with the features and principles of the present invention. As shown, program 300 may include a first data engine 310, a second data engine 320, and a user interface 330. In an exemplary embodiment, program 300 is operational in the playback of audio and or visual components of first data 210 and second data 220.

In an exemplary embodiment, user interface 330 represents the portion of program 300 that interfaces with a user. In an exemplary embodiment, user interface 330 may provide a graphical interface for a user. In alternate embodiments, user interface 330 may provide a textual, tactile, sensing, or audio interface instead of or in addition to a graphical interface. For example, user interface 330 may sense voice commands. These voice commands may be provided in English or in a non-English language. As another example, user interface 330 may sense a user's interaction with a musical instrument, such as via key, string, or note depressions, or sound played from the musical instrument. These and other embodiments are within the spirit and scope of the invention.

In an exemplary embodiment, user interface 330 receives input from a user. User interface 330 may also present the user with playback options. For example, user interface 330 may provide a user with the option of selecting a file to play. When the user selects an exemplary file 200, user interface 330 may cause program 300 to read a portion of file 200. Program 300 may read file 200 for a number of purposes, including to validate file 200 for further processing, or to pre-process file 200 for playback. The file may represent, in some embodiments, media in a form such as a lesson, song, or set to play.

User interface 330 may also provide a user with the option to start, stop, or pause play. User interface 330 may, in some embodiments, enable a user or other control mechanism to change the tempo of playback. In addition, user interface 330 may allow a user to jump to another location in the media. User interface 330 may also include a button, icon, or other similar component configured to permit a user to select one or more languages. For example, a user may select an icon to hear instructions in Japanese and select another icon to hear instructions in French, German, Spanish, or any other language.

In an exemplary embodiment, program 300 may enable the synchronized playback of at least a portion of first data 210 and second data 220. The manner in which playback is synchronized may comprise a polling algorithm that polls the first and second data for a real-time marker or near real-time marker indicating the portion of the first and second data that is being played. In an exemplary embodiment, as shown, polling algorithm 312 may be a component of first data engine 310. Those skilled in the art will recognize alternate embodiments wherein polling algorithm 312 may be implemented in other modules of program 300, or even external to program 300. Polling algorithm 312 may poll at a selected frequency. In an exemplary embodiment, polling algorithm receives a first marking code 216-$j$ from first data 210 and a second marking code 226-$k$ from second data 220 upon polling first data 210 and second data 220. In some embodiments, the precision of measurement may be about 100 nanoseconds. In still other embodiments, the precision of measurement may vary from several milliseconds to about 100 nanoseconds. It should be understood by those skilled in the art that any precision of measurement for the polling frequency may be selected without departing from the spirit and scope of the invention.

In some embodiments, first data engine 310 may comprise a module 314 configured to compute a discrepancy value based on the polling results. For example, program 300 may compute a correlation between the first and second marking code, which may allow module 314 to compute a discrepancy between the location of playback of first data 210 and second data 220, if any. In an exemplary embodiment, program 300 may convert one or more portions of first data 210 and second data 220 into a particular time unit for the purpose of comparison. For instance, program 300 may convert marking code 226-$k$ into a value, such as marking code 216-1, that may be readily comparable to marking code 216-$j$. In another exemplary embodiment, program 300 may convert marking code 216-$j$ into a value, such as 226-$m$, that may be readily comparable to marking code 226-$k$. Alternatively, marking codes 216-$j$ and 226-$k$ may both be converted into another unit of measurement. If the computed discrepancy is greater than a tolerance value, program 300 performs one or more actions. In some embodiments, the tolerance value may be in the same time unit as the one or more converted marking code, or program 300 may provide a method for converting the tolerance value into the correct unit.

In an alternate embodiment, polling algorithm 312 may receive one or more marking codes from first data 210 and/or second data 220. Polling algorithm may receive additional variables to facilitate a reasonable or more accurate measure of the discrepancy of playback locations between first data 210 and second data 220. Such variables may include memory load on data processing system 110, processor load on data processing system 110, and input received from a user. These and other embodiments are within the spirit and scope of the invention.

As shown, first data engine 310 may additionally comprise module 316 for computing a correlation marker. The correlation marker may comprise one or more marking codes selected from marking codes 216 and/or 226. In an exemplary embodiment, based on one or a combination of the correlation marker, the discrepancy value, and the tolerance value, polling algorithm 312 may perform an action to synchronize playback. One such action may be pausing forward playing of the second data until the first data reaches the correlation marker. Another action may be cuing the playback of the second data to jump to or begin at the correlation marker. Another action may be to resume regular execution of the program.

In some embodiments, the action to pause or cue the second data may be triggered by first data engine 310 to second data engine 320. In such embodiments, first data engine 310 may control the playback of audio and/or visual components from first data 210 with user interface 330. Second data engine 320 may control the playback of audio and/or visual components from second data 220 with user interface 330. In some exemplary embodiments, first data engine 330 may comprise a Microsoft DirectShow filter graph. In such embodiments, the filter graph may provide certain functionality, including seeking within first data 210, varying playback tempo of first data 210, providing data to user interface 330, and displaying visual components of first data 210. In other embodiments, an alternate audio and/or video engine can be deployed to provide similar functionality.

In some embodiments, first data engine 310 may trigger the playing of second data 220 by second data engine 320 base on a particular playback position of first data 210. For instance, one or more marking codes 226 of second data 220 may comprise a time at which the playback of second data 220 should commence. These marking codes are adapted to correlate to one or more marking codes 216, signaling a particular playback position of first data 210 at which playback of second data 220 may start.

In some embodiments, program 300 may additionally include one or more algorithms 340-1, . . . , 340-$n$. For example, when a user or similar process causes a change in the playback tempo, program 300 may be configured to include an interpolation algorithm 340-1, which may execute and interpolate at least one or a portion of first data 210 and second data 220. An exemplary interpolation algorithm may analyze the data that will be played and interpolate the data to improve the playback quality and minimize changes in pitch or frequency caused by speeding up or slowing down the tempo.

In still other embodiments, program 300 may use a portion of second data 220 to illuminate one or more finger positions for an instrument, such as a piano. In an exemplary embodiment, visual component 224, which may be a portion of second data 220, may be used to illuminate one or more LEDs on a guitar fret in time. In such embodiments, the illumination of LEDs may be synchronized with audio and/or video playback.

Program 300 may additionally include a threshold tempo. In some embodiments, when the playback tempo is slowed beyond the threshold tempo, program 300 may cause audio component 222, which may be a portion of second data 220, to play. In such embodiments, second data engine 320 may cause portions of audio component 222 to be transmitted to a receiving system 120 such as audio system 120-6. In alternate embodiments, second data engine 320 may cause portions of visual component 224 to be transmitted to a receiving system 120 such as a display system 120-4. In alternate embodiments, the playback tempo may differ from the recorded tempo by an amount exceeding a threshold. For example, a user may increase the playback tempo above the recorded tempo. These embodiments, combinations therefrom, and alternate embodiments are within the spirit and scope of the invention.

In some embodiments, when second data engine 320 causes a portion of audio component 222 and/or visual component 224 to be transmitted to one or more receiving systems 120, first data engine 310 may cause a correlated portion of audio component 212 and/or visual component 214 to not be transmitted to receiving systems 120. In such embodiments, it may be understood that audio and/or video playback of the portion of second data 220 may replace audio and/or visual playback of a portion of first data 210. In some embodiments, this occurs during a time in which the user or process-selected tempo is below a threshold. In some embodiments, the threshold may be understood as the lowest or highest tolerated tempo at which audio component 212 and/or visual component 214 are played.

Figure 4:
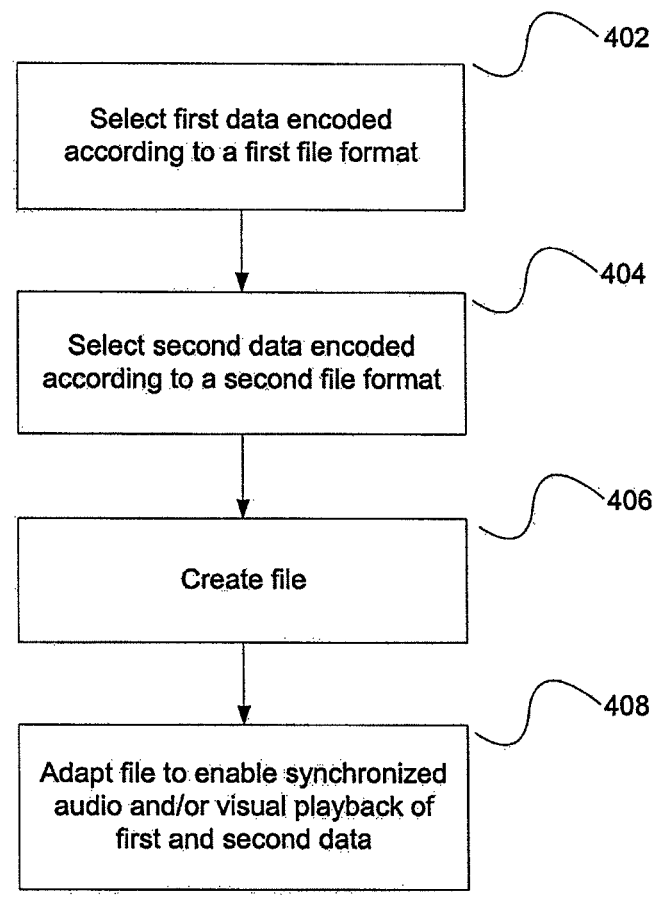
FIG. 4 illustrates a flow diagram of an exemplary method for creating a file.

FIG. 4 is a flow diagram illustrating an exemplary method 400 for creating file 200 that may be used by program 300, consistent with the features and principles of the present invention. At step 402, a first data is selected. The first data may comprise first data 210 described above with reference to FIG. 2, including portions of audio component 212, visual component 214, and marking codes 216, though it needs not include all three components 212, 214 and 216, and these portions need not be contiguous. In one embodiment, visual component 214 is a data component of first data 210 that may be processed and transformed into visual cues. In one embodiment, audio component 212 is a data component of first data 210 that may be processed and transformed into sound. Marking codes 216 is a data component of first data 210 that correlates between first data 210 and second data 220.

At step 404, a second data is selected. The second data may comprise second data 220 described above with reference to FIG. 2, including portions of audio component 222, visual component 224, and marking codes 226, though it needs not include all three components 222, 224 and 226, and these portions need not be contiguous. In one embodiment, visual component 224 is a data component of second data 220 that may be processed and transformed into visual cues. In one embodiment, audio component 222 is a data component of second data 220 that may be processed and transformed into sound. Marking codes 226 is a data component of second data 220 that correlates data between first data 210 and second data 220.

At step 406, file 200 is created based on the selected first data 210 and second data 220. In one embodiment, as illustrated in step 408, file 200 is configured to synchronize audio and/or visual playback of first data 210 and second data 220 by correlating, in time, the two sets of data. In some embodiments, file 200 may contain reference to one or more memory space addresses where the data are stored. Also in some embodiments, additional data may be selected for file 200. Examples of additional data include but are not limited to one or more additional data encoded according to the second file format and one or more additional data encoded according to the first file format. Details regarding data playback synchronization will be described below with reference to FIG. 5.

Figure 5:
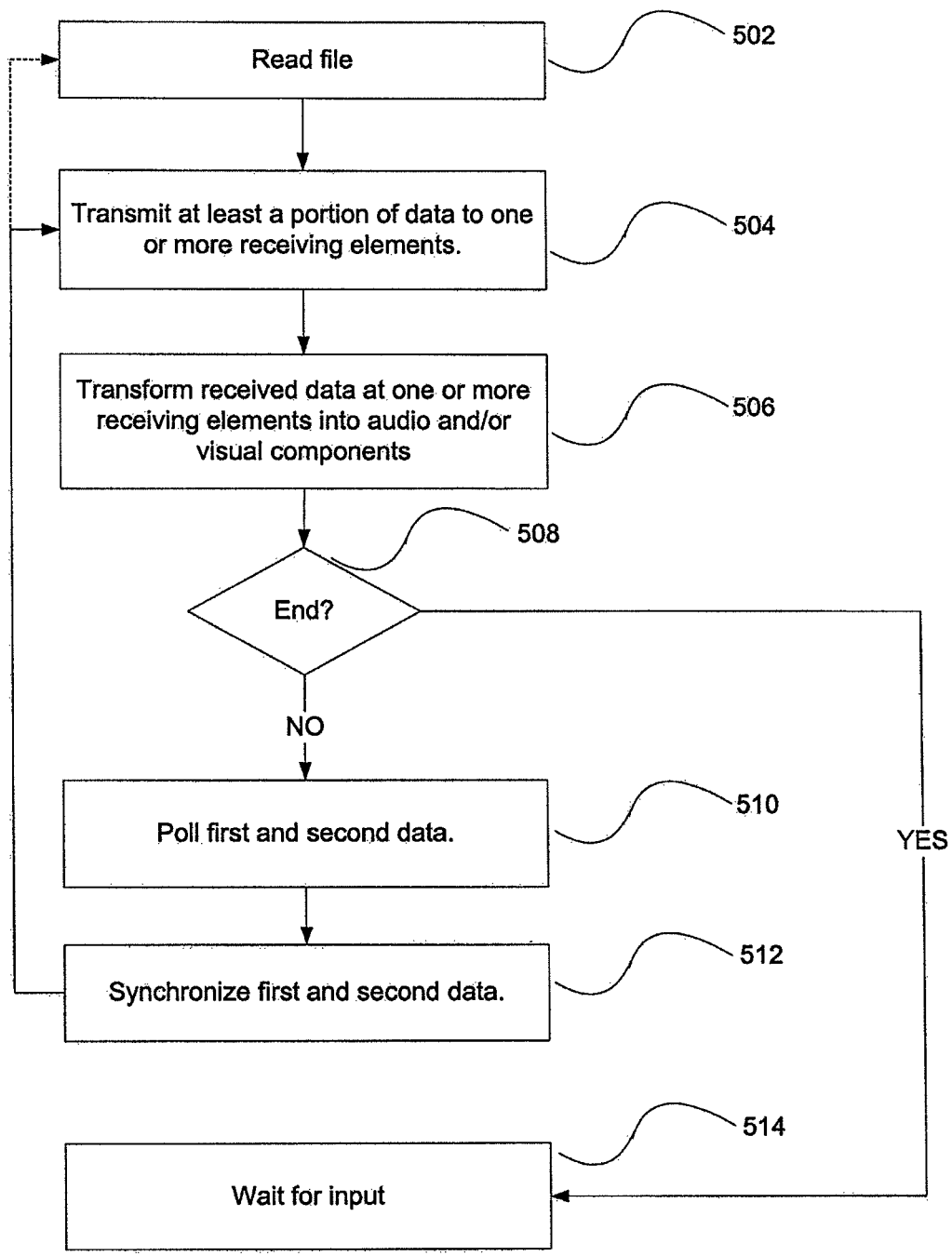
FIG. 5 illustrates a flow diagram of an exemplary method for processing the file to synchronize audio and/or video playback.

FIG. 5 is a flow diagram illustrating an exemplary method 500 used by program 300 to process file 200 for the purpose of audio and/or visual playback synchronization, consistent with the features and principles of the present invention. Separate playback of audio and/or video components associated with one or more data signals may introduce offset problems during playback. In many instances, an offset may stay constant or drift with time, resulting in a loss of synchronization between the audio and/or video components. Moreover, an offset may not be easily corrected if accurate timing information is difficult to retrieve from the data signals. Hence, techniques that can accurately and efficiently synchronize data signals and address other related timing issues may be advantageous in some exemplary embodiments.

First, at step 502, program 300 reads file 200, which may be created according to method 400 described above with reference to FIG. 4. Next, at step 504, program 300 sends one or more portions of the read data to one or more receiving elements 120 operatively coupled to system 100. In one embodiment, program 300 is configured to transmit data wirelessly from the file to the receiving elements 120. In one embodiment, one or more receiving elements 120 are further configured to process the received data and/or transmit it to at least one other receiving element 120 for audio and/or video playback.

At step 506, receiving elements 120 transform one or more portions of the received data into audio and/or visual components having a selected tempo. Exemplary receiving elements 120 include a data processing system, an instrument system, such as instrument system 120-2, a display system, such as display system 120-4, and an audio system, such as audio system 120-6.

Next, at Step 508, program 300 determines whether it should wait at step 514 based upon reaching an end state. Some exemplary end states include but are not limited to program execution reaching the end of file 200, program execution reaching the end of first data 210, program execution reaching the end of second data 220, and program execution reaching the end of a lesson or set. If an end state is not reached, program 300 proceeds to steps 510 and 512 to synchronize the visual and/or audio components of first data 210 and second data 220. In step 510, program 300 uses algorithm 312 to poll the two sets of data at a selected frequency. An exemplary polling frequency may be 1 per about 100 nanoseconds. In other embodiments, a polling frequency may be selected from a range from 1 per about 100 milliseconds to 1 per about 1 microsecond, or may comprise any polling frequency which is reasonable to one of ordinary skill in the art. As a result, polling algorithm 312 may identify one or more portions of first marking code 216 and second marking code 226 from first data 210 and second data 220, respectively, based on which program 300 initiates specific synchronization actions at step 512. Details regarding data synchronization will be explained below with reference to FIG. 6. Next, program execution repeats at step 504 or 502 so that one or more portions of the synchronized data may be transmitted and played on their respective receiving elements 120.

Figure 6:
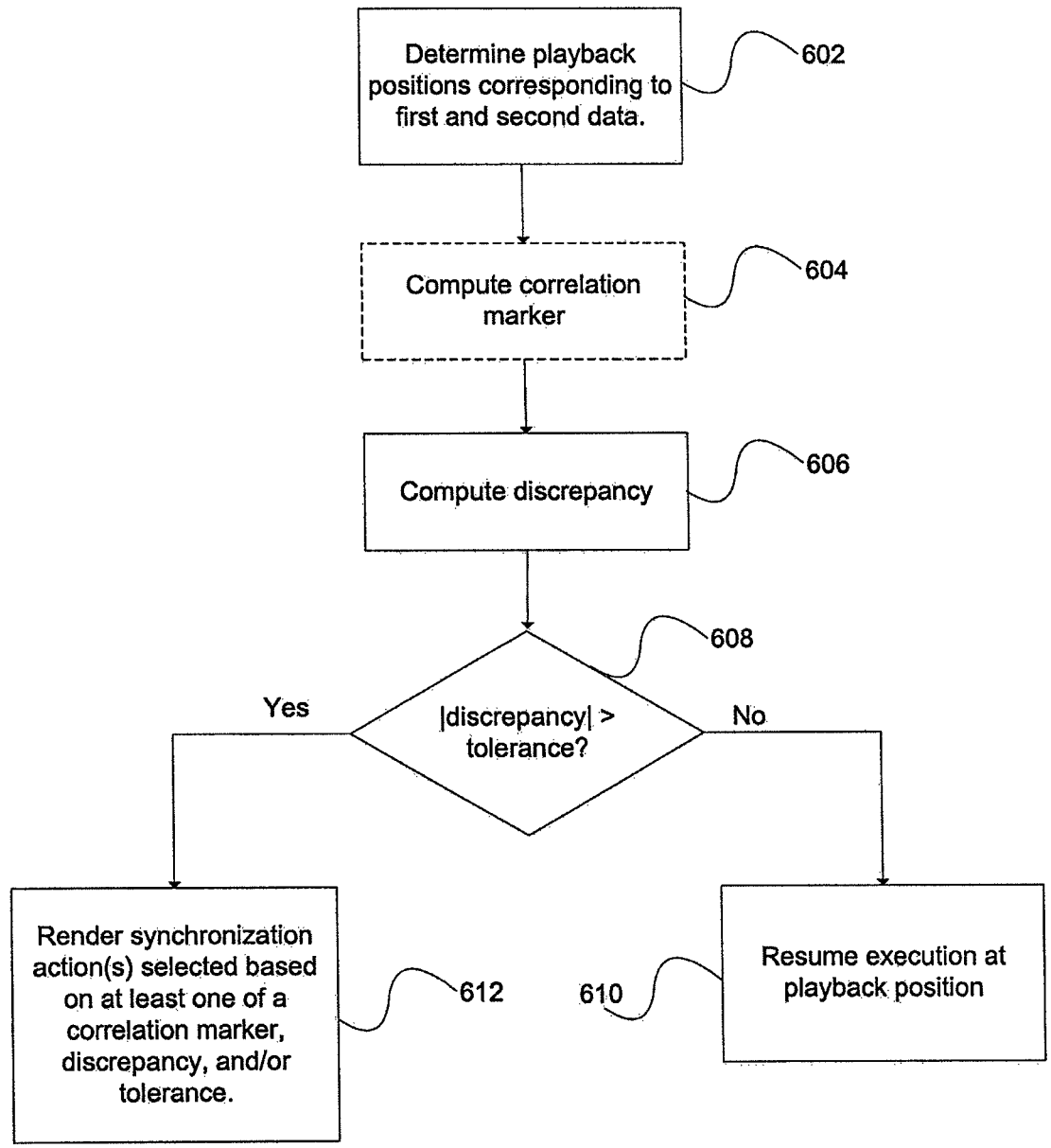
FIG. 6 illustrates a flow diagram of an exemplary method for synchronizing data in the file.

FIG. 6 is a flow diagram illustrating an exemplary method 600 for synchronizing first data 210 and second data 220 at a particular polling frequency, consistent with the features and principles of the present invention. In one embodiment, as shown in step 602, program 300 may use the pair of marking codes, identified from first marking code 216 and second marking code 226 using polling algorithm 312, to determine data playback positions. In one example, each identified pair of marking codes provides a measurement of the audio and/or video playback positions of first data 210 and second data 220 in real-time or in near real-time. Thereafter, the identified pair of marking codes may be used by program 300 to perform time correlation between first data 210 and second data 220. In an exemplary embodiment, polling algorithm 312 may request a playback position of first data 210, which value may be measured in SMPTE time base units. Polling algorithm 312 may also request a playback position of second data 220, which value may be measured in tick position units. Polling algorithm 312 and/or module 314, in some embodiments, may convert a tick position to a SMPTE time base. An exemplary method for converting a tick position to a SMPTE time base comprises the step of determining all the tempo changes that have been in effect up to the current tick position of second data 220. For each tempo change, a method may tally the number of ticks elapsed during that particular tempo segment. In some instances, a tempo map may be provided that contains tempo units such as, for example, beats per minute, microseconds per quarter note, ticks per quarter note and quarter notes per minute. Using the tempo map and the number of ticks per tempo segment, a method may compute the amount of time each tempo segment was played. An accumulation of the times for all the tempo segments up to the tick position of second data 220 represents the playback position of second data 220, which may then be compared with a SMPTE time base marker polled from first data 210.

To achieve time correlation at a selected polling frequency, program 300 may optionally use module 316 to compute, at step 604, one or more correlation markers based on each pair of marking codes identified by polling algorithm 312. In an exemplary embodiment, second data 220 may be playing ahead of first data 210, in time. In such an embodiment, polling algorithm 220 may pause playback of second data 220 until first data 210 has reached the same playback time and/or position. In an exemplary embodiment, module 316 may compute a correlation marker. A correlation marker comprises one or more marking codes and indicates the desired playback position, in time, that should be reached for at least one of first data 210 and second data 220 to achieve synchronization. In an exemplary embodiment, a correlation marker may be computed by converting a SMPTE time base marker of first data 210 to a corresponding tick position that can be compared with the tick position of second data 220. To achieve such conversion, a method may first determine the current tempo and the starting time at which the current tempo was activated. The time lapse between the start of the current tempo and the SMPTE time base marker may then be used to compute the number of ticks, subsequent to the start of the current tempo, that corresponds to the SMPTE time base marker. Combining this tick count with the tick count from the beginning of playback of second data 220 to the start of the current tempo yields the total number of ticks, or tick position, corresponding to the SMPTE time base marker. In some exemplary embodiments, the tick position which corresponds to the SMPTE time base marker may serve as the correlation marker. In such embodiments, first data engine 310 may signal second data engine 320 to cue playback of second data 220 to the begin at the correlation marker.

In one embodiment, program 300 may use module 314 to compute a discrepancy between the marking codes identified by polling algorithm 312, as shown in step 606. This discrepancy value represents the amount of time by which first data 210 and second data 220 are offset at the polling frequency. As described above with reference to FIG. 3, because first data 210 and second data 220 may have different units for measuring playback time, polling algorithm 312 may need to first convert one or both of the identified marking codes into a common time unit before computing the discrepancy value. In other embodiments, program 300 may compute the discrepancy value prior to, or simultaneous with, computing the correlation markers.

Next, at step 608, program 300 compares the discrepancy value with a tolerance value to determine whether synchronization of the two sets of data is required. The tolerance value may be selected by a user or hard-coded into system 100. The tolerance value may be in the same time-measuring unit as the converted pair of marking codes. In one embodiment, the playback of visual and/or audio components of first data 210 may not need to be synchronized with that of second data 220 if an absolute value of the discrepancy value is less than the tolerance value. In such case, at step 610, program 300 resumes the playing of first data 210 and second data 220 from the correlation marker without performing synchronization. In one embodiment, the playback of visual and/or audio components of first data 210 may need to be synchronized with that of second data 220 if an absolute value of the discrepancy value is larger than the tolerance value. In that case, at step 612, program 300 initiates a specific synchronization action based on at least one of the correlation marker, the discrepancy value, and the tolerance value. In one embodiment, if the playback of second data 220 is faster than that of first data 210, program 300 pauses the forward playing of second data 220 until the playing of first data 210 reaches the correlation marker. In another embodiment, if the playback of second data 220 is slower than that of first data 210, program 300 cues the playing of second data 220 to the correlation marker. In alternative embodiments, program 300 may compute at least two correlation markers corresponding to first data 210 and second data 220. Each correlation maker is adapted to indicate a position to which the playback of the corresponding data should reach in order to synchronize the two sets of data to within the desired tolerance range.

In one embodiment, program 300 may synchronize the start playing time of second data 220 with a particular playback position of first data 210. For instance, one or more marking codes 226 of second data 220 may comprise a time at which the playback of second data 220 should commence. These marking codes are adapted to correlate to one or more marking codes 216, signaling a particular playback position of first data 210 at which playback of second data 220 may start.

Figure 7:
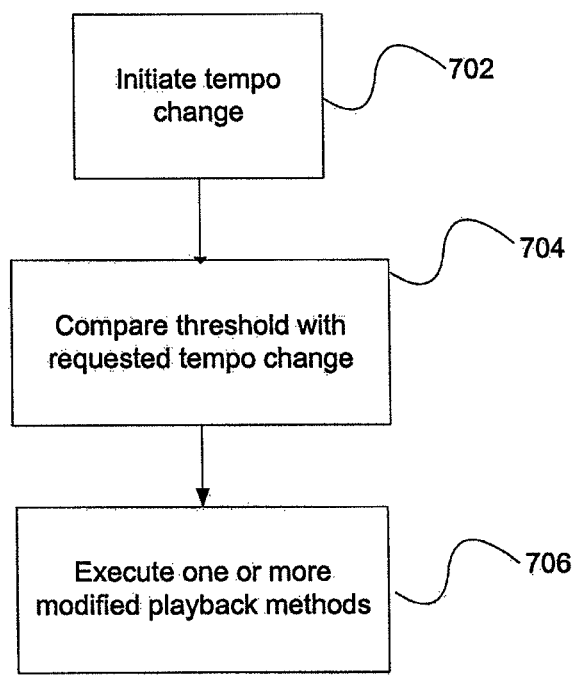
FIG. 7 illustrates a flow diagram of an exemplary method for preserving playback quality of one or more visual and/or audio components in response to a change in playback tempo.

FIG. 7 is a flow diagram illustrating an exemplary method 700 for improving or preserving the playback quality of one or more audio and/or visual components while a user and/or a process changes the playback tempo. A user or process may initiate a change in the playback tempo in an instance where the user is learning the music and needs to slow down the playback tempo.

At step 702, program 300 responds to a user input or a process input, requesting a change to the current playback tempo. A change in tempo may be enabled in discrete values, including but not limited to increments of 0.1%, 0.25%, 0.5%, 1%, 5%, 25/3%, 10%, and 12.5%. A tempo change also may be enabled in relatively continuous increments. In an exemplary embodiment, a tempo change my be enabled in whole number increments, allowing a user to select a playback tempo ranging between 20% and 125% of a recorded tempo. A change in tempo may be input to program 300 via user interface 330. In an exemplary embodiment, a user may use a tempo slide bar that may appear on a monitor or display of user interface 330, performing as a graphical user interface, on a data processing system. In an alternate embodiment, a user may adjust a dial. A dial may be displayed on a graphical user interface, or exist as a physical embodiment connected to data processing system 110, instrument system 120-2, or any other system that may be operatively coupled to program 300 and/or user interface 330. In another alternate embodiment, a user may input a numerical value. These and other embodiments are within the spirit and scope of the invention.

In one embodiment, program 300 causes a change in the tempo by interpolating at least a portion of first data 210 or second data 220 using, for example, interpolation algorithm 340-1. As described above with reference to FIG. 3, an exemplary interpolation algorithm may analyze the data and interpolate the data to improve the playback quality and minimize changes in pitch or frequency caused by speeding up or slowing down the tempo. It is to be understood that interpolation techniques known by a person skilled in the art may be utilized to perform this interpolative function without departing from the spirit and scope of the present invention.

In one embodiment, a threshold is selected. A threshold may comprise one or more tempos that produces a minimally acceptable visual and/or audio playback quality on one or more receiving elements 120. The selected threshold may relate to a pre-selected tempo for playback of at least one of first data 210 and second data 220. In some embodiments, a pre-selected playback tempo may comprise a tempo at which the audio and/or video was recorded or intended to be played. A minimally acceptable playback quality may be related to the affect of the tempo change on the pitch of audio component 212. In some cases, a change in the tempo of an audio component 212 may be proportional to the affect on the pitch and/or sound quality. In some cases, the affect on the pitch can be observed if first data 210 and/or audio component 212 is in a format including but not limited to formats represented by mp3, wma, wmv, and avi. At step 704, program 300 compares the modified tempo with the threshold value to determine what playback action program 300 should take in order to preserve the playback quality of the modified tempo.

In one embodiment, at step 706, if the modified tempo slows or speeds beyond the threshold tempo, program 300 may, during a time in which the threshold is not achieved, transmit at least a portion of visual component 222 and/or audio component 224 of second data 220 to receiving elements 120. Additionally, these playback actions from second data 220 may replace any playback actions generated by a correlating portion of audio component 212 and/or visual component 214 of first data 210, even though the data components themselves are not replaced. Algorithm 340-2 may include an implementation of this routine. In an exemplary embodiment, when the aforementioned action is executed, at least a portion of audio component 222 may replace playback or transmittal of a corresponding portion of audio component 212. In some embodiments, program 300 may continue to transmit visual component 214 and visual component 224 for playback at a tempo multiplied by a factor in proportion to the initiated tempo change.

In another embodiment, during a time in which the threshold is not achieved, program 300 may play at least a portion of the visual and/or audio components of a third data. This playback action may replace one or more playback actions generated by a correlating portion of visual component 212 and/or audio component 214 of first data 210. The third data may include audio and/or visual components having a tempo different from the predetermined tempo. For instance, the third data may comprise audio and/or visual components recorded at varying tempos including but not limited to 80-, 60-, 40- and 20-percent of the predetermined tempo. In alternate embodiments, the third data may comprise audio and/or visual components recorded at a tempo 120-, 140-, 160- and 180-percent of the predetermined tempo for speeding up the predetermined tempo. Algorithm 340-3 may include an implementation of this routine.

In yet another embodiment, during a time in which the threshold is not achieved, program 300 plays a least a portion of the audio and/or visual components associated with at least one of second data 220, the third data, an interpolated data, and any combinations thereof. In addition, this playback action may replace one or more playback actions generated by a correlating portion of first data 210, even though the data components themselves are not replaced. Algorithm 340-3 may include an implementation of this routine. Execution of algorithm 340-3 may comprise function calls to at least one of algorithms 340-1, 340-2, and 340-3.

In some embodiments, one or more of the above-described actions may be executed at step 706. Additionally and optionally, at step 706, program 300 may combine an interpolation algorithm with another action. For example, in an instance where file 200 contains a third data and in the case where a tempo change to 75% of the pre-selected tempo is initiated at step 702, program 300 may switch playback to a third data recorded at 80%, and further reduce the tempo by 5% using an interpolation algorithm. In an alternate embodiment, program 300 may not require an interpolation algorithm for a minor tempo change, and may multiply at least a portion of first data 210 and/or second data 220 by a factor to modify the pre-selected tempo. For example, if a tempo change to 90% of the pre-selected tempo is initiated at step 702, program 300 may multiply the real-time markers in first data 210 and the tempo markers in second data 220 by a factor of 0.9. In some embodiments, this factor may affect first data 210 and second data 220 during the period or time in which the tempo remains at 90%.

Figure 8:
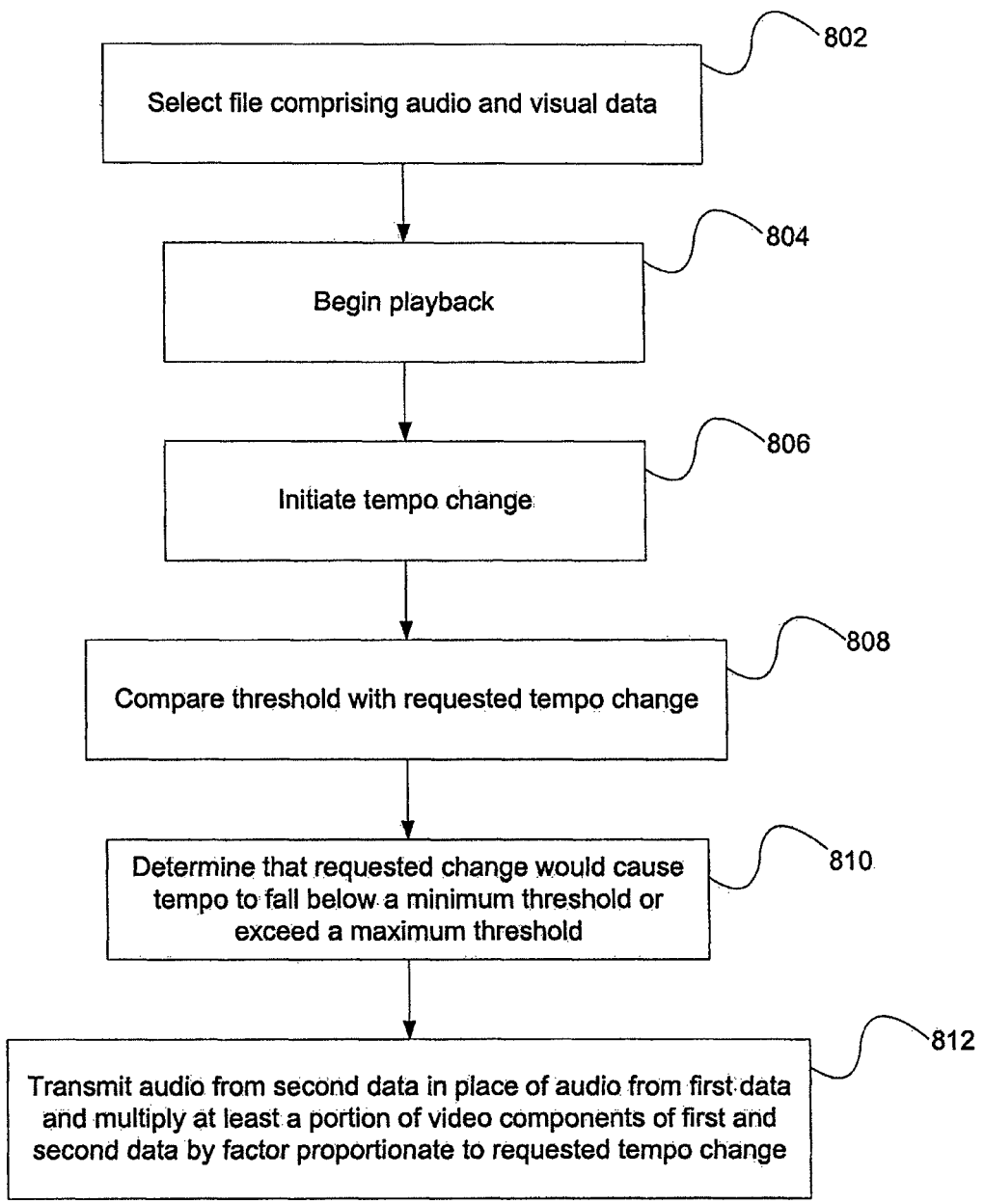
FIG. 8 illustrates a flow diagram of an exemplary method for preserving playback quality of an audio component in response to a change in playback tempo.

FIG. 8 is a flow diagram illustrating an exemplary method 800 for improving or preserving the playback quality of an audio component while a user and/or process changes the playback tempo. As shown at step 802, a file comprising audio and visual components is selected. In an exemplary embodiment, both first and second data comprise audio and visual components. For example, first data may comprise audio data of a musical performance and video data depicting the musical performance. Second data may comprise audio corresponding to the same musical performance as well as a visual component corresponding to illuminated finger positions on a musical instrument that correspond to the audio and/or visual portion of the first and/or second data. In particular, the finger position data can be data that illuminate finger positions on the fret board of a stringed instrument such as, for example, a guitar. The illuminated finger positions teach or assist a user with playing the music of the audio component of the first and/or second data. At step 804, playback begins at a pre-selected tempo. In an exemplary embodiment, the pre-selected tempo may be the tempo at which the musical performance of the first data was originally recorded. At step 806, a tempo change may be initiated. As shown, a tempo change may be initiated after playback begins. In an alternate embodiment, a tempo change my be initiated prior to beginning playback. At step 808, when the tempo change has been initiated, program 300 may compare the requested tempo change with a threshold for a maximally acceptable deterioration of sound quality. In an embodiment, an exemplary threshold may be >75% of the pre-selected tempo. At step 810, program 300 may determine that the requested tempo change would cause the tempo to fall below a minimum threshold or above a maximum threshold. In an exemplary embodiment, a requested tempo change that may cause the tempo to fall below the threshold may be 75% of the pre-selected tempo. In response to the determination made during step 810, program 300 may proceed to step 812. At step 812, program 300 may cause the second data engine 220 to transmit a portion of the audio component 222 associated with second data 220 to an audio system 120-6. Also at step 812, program 300 may cause the first data engine 210 to cease transmission of a portion of audio component 212. Additionally, at step 812, program 300 may adjust the tempo of visual components 214 and 224. In an exemplary embodiment, program 300 may adjust the tempo by multiplying one or more real time markers of first data 210 and/or visual component 214 by the tempo factor, which in an embodiment, may be 0.75, corresponding to 75% of the pre-selected tempo. Additionally, in adjusting the tempo, program 300 may multiply one or more tempo markers of second data 220 and/or visual component 224 by the tempo factor. In an exemplary embodiment, at step 812, a user may observe that the musical playback, the playback of finger positions on the guitar fret, and the video of the musical performance slow down. In an exemplary embodiment, the video of the musical performance may hold a frame in a display system 120-4 for a longer time proportional to the change in tempo. In some embodiments, video may be recorded at a pre-selected tempo of 24 frames per second. A tempo change to 75% may cause video playback to play 18 frames per second.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for processing audio or visual data comprising the steps of:
   reading a first data encoded according to a first file format, said first data having a first tempo;
   reading a second data encoded according to a second file format, said second data including information relating to finger positions on a musical instrument and having a second tempo; and
   processing at least one of said first data and said second data into an audio or visual component having a pre-selected tempo;
   polling at least one of said first data and said second data; and
   synchronizing said audio or visual component by performing an action based on a polling result; wherein the action is selected from a set comprising computing a correlation marker, pausing forward playing of said second data for an amount of time, cueing the playing of said second data forward by an amount of time; and resuming regular program execution.

2. The method of claim 1, further including selecting a portion of at least one of said first data and said second data to generate a signal for transmission to a receiving element selected from a set comprising an audio system, a display system, a data processing system, and an instrument system configured to display a finger position based on the signal.

3. The method of claim 2, wherein said signal is wirelessly transmitted to said receiving element.

4. The method of claim 1, further including:
   responding to a change in said pre-selected tempo by at least one of: selecting a threshold tempo based on at least one of said first tempo and said second tempo; interpolating at least a portion of at least one of said first data and said second data; playing only a portion of said second data while a real time tempo is outside said threshold tempo; and playing a third data while the real time tempo is outside said threshold tempo.

5. The method of claim 4, further including:
   selecting the third data from having a tempo different from said first tempo and said second tempo.

6. The method of claim 1, wherein the audio component includes a first language and a second language different to the first language.

7. The method of claim 1, wherein said first data and said second data are contained in a single file.

8. A data processing system for synchronized audio and visual playback, comprising:
   a first data encoded according to a first file format;
   a second data encoded according to a second file format and including information relating to a finger position on a stringed instrument; and
   a processor configured to access and process said first data and said second data to output a signal containing a representation of synchronized said first data and said second data, and compute a correlation marker based on a marking code selected from at least one of a first set of marking codes associated with the first data and a second set of marking codes associated with the second data
   wherein processing executes an algorithm to poll at a polling frequency, computes a discrepancy value based on the polling step, compares the discrepancy value with a tolerance value, and performs an action based on the correlation marker, the discrepancy value, and the tolerance value, and
   wherein the action is selected from a set comprising pausing forward playing of the second data until the first data reaches the correlation marker, cueing playing of the second data to the correlation marker, and resuming regular execution of the algorithm.

9. The system according to claim 8, wherein the first data includes at least one of an audio data and a visual data.

10. The system of claim 9, wherein at least a portion of the second data includes a representation of the audio data in a format different to the first file format and synchronized to information relating to the finger position on the stringed instrument.

11. The system of claim 8, wherein the processer is configured to correlate the first data and the second data in time based on a marking code.

12. The system of claim 11, wherein the marking code includes at least one of a tick position, a marker, and a SMPTE time code.

13. The system of claim 12, wherein the system further includes a module configured to insert at least a portion of a first set of marking codes into the first data and insert at least a portion of a second set of marking codes into the second data in response to a user input.

14. The system of claim 8, wherein processing transforms the first data and the second data into at least one of an audio component and a visual component.

15. The system of claim 14, further including processing at least one of the audio component and the visual component at a playback tempo.

16. The system of claim 15, wherein processing executes an algorithm configured to interpolate at least part of at least one of the first data and the second data based on a change of the playback tempo and multiply each of a real time tempo associated with the first data and a MIDI tempo associated with the second data by a factor associated with the change in the playback tempo.

17. The system of claim 15, further including receiving a user input to modify the playback tempo.

18. The system of claim 17, wherein processing produces the audio component and the visual component from a second portion of the second data when a threshold tempo is not achieved upon a change in the playback tempo.

19. The system of claim 18, wherein the second portion of the second data replaces at least a portion of the first data in the signal.

20. The system of claim 15, further including a receiving system comprising at least one of an audio system, a display system, a data processing system, and an instrument system configured to display a finger position based on the signal.

21. The system of claim 20, wherein at least one of the first data and the second data is streamed over a network to the receiving system.

22. The system of claim 8, wherein the signal contains information to illuminate one or more finger positions on a guitar fretboard.

23. The system of claim 8, wherein at least one of the first data and the second data is streamed across a network to the processor.

24. They system of claim 8, wherein the first data and the second data are stored in a single file.

25. The system of claim 8, wherein at least one of the first data and the second data further include a marking code corresponding to an initiation time configured to synchronize the output of the first data and the output of the second data.

26. The system of claim 25, further including initiating output of the second data at the initiation time.

27. A computer-implemented method for processing data, comprising:
  selecting a first data encoded according to a first file format;
  selecting a second data encoded according to a second file format, the second data including information relating to a finger position on a musical instrument;
  polling at least one of the first data and the second data to produce a polling result;
  synchronizing the first data and the second data based at least partially on the polling result; and
  generating at least one of an audio signal and a visual signal,
  wherein synchronizing includes at least one of computing a correlation marker, pausing forward playing of the second data for an amount of time, cueing the playing of the second data forward by an amount of time, and resuming a regular program.

28. The method of claim 27, wherein synchronizing includes correlating, in time, the first data and the second data.

29. The method of claim 27, wherein the first file format includes audio data containing encoded pitch data that varies in relation to a playback tempo.

30. The method of claim 29, wherein the first file format includes at least one of m4a, wma, mp3, way, aac, aaf, avi, mov, m1v, m2v, divx, wmv xvid qtch, mpeg, mpeg-4, asf, H.263, and H.264.

31. The method of claim 29, wherein the audio data includes data encoding at least one language.

32. The method of claim 27, wherein the second data is encoded in a MIDI format.

33. The method of claim 32, wherein at least a portion of the second data includes a visual component having finger position data for the illumination of a finger position on a guitar fretboard.

34. The method of claim 33, wherein a user selects the second data.

35. The method of claim 27, wherein at least one of the first data and the second data further includes a marking code corresponding to an initiation time configured to permit synchronization of the first data and the second data.

36. The method of claim 35, further including initiating output of the second data at the initiation time.

37. The method of claim 27, wherein the first data or the second data is streamed across a network.

38. The method of claim 27, wherein the first data and the second data are located in a single file.

39. The method of claim 27, further including computing a correlation marker based on a marking code selected from at least one of a first set of marking codes associated with the first data and a second set of marking codes associated with the second data.

* * * * *